United States Patent [19]
Taga et al.

[11] Patent Number: 5,430,795
[45] Date of Patent: Jul. 4, 1995

[54] OPTICAL TRANSMITTER WITH THE SIGNAL LIGHT OF REDUCED DEGREE OF POLARIZATION AND OPTICAL DEPOLARIZING CIRCUIT

[75] Inventors: Hidenori Taga, Sakado; Noboru Edagawa, Tokyo; Shu Yamamoto, Shiki; Shigeyuki Akiba, Tokyo; Hiroharu Wakabayashi, Kawasaki, all of Japan

[73] Assignee: Kokusai Denshin Denwa Company, Limited, Tokyo, Japan

[21] Appl. No.: 58,108

[22] Filed: May 6, 1993

[30] Foreign Application Priority Data

May 8, 1992 [JP] Japan ............................ 4-116440
May 13, 1992 [JP] Japan ............................ 4-120676

[51] Int. Cl.⁶ ............................................ G02B 6/00
[52] U.S. Cl. .................................. 359/179; 359/174; 359/180; 359/188
[58] Field of Search ............. 359/179, 183, 188, 156, 359/180, 174, 494, 498, 306; 356/345, 346, 351

[56] References Cited

U.S. PATENT DOCUMENTS

| | | | |
|---|---|---|---|
| 4,572,608 | 2/1986 | Mochizuki et al. | 350/96.15 |
| 4,886,334 | 12/1989 | Aoki | 359/174 |
| 4,923,291 | 5/1990 | Edagawa et al. | 350/389 |
| 5,223,972 | 6/1993 | Nishimura et al. | 359/337 |

FOREIGN PATENT DOCUMENTS

| | | | |
|---|---|---|---|
| 59-155806 | 9/1984 | Japan . | |
| 2207322 | 7/1987 | United Kingdom | 359/156 |
| 1728832 | 4/1992 | U.S.S.R. | 359/188 |

OTHER PUBLICATIONS

Electronics Letters 21, Jan. 1993 vol. 29 No. 2 Observation of BER Degradation Due To Fading In Long-Distance Optical Amplifier System.
Journal of Lightwave Technology, vol. LT-1, No. 3, Sep. 1983 Degree of Polarization In The Lyot Depolarizer.

*Primary Examiner*—Hezron E. Williams
*Assistant Examiner*—Richard A. Moller
*Attorney, Agent, or Firm*—Jordan and Hamburg

[57] ABSTRACT

An optical transmitter for providing a signal light with a reduced degree of polarization, the transmitter being used as a transmitting terminal of an optical repeater system that encompasses optical amplifiers at a signal light transmitter, the optical transmitter includes an optical source for transmitting a signal light source; and a degree of polarization reducing circuit including a polarizing beam splitter splitting the signal light source from the optical source means into a first polarized component and a second polarized component that are orthogonal to each other; a first optical path transmitting the first polarized component input from the polarizing beam splitter while maintaining the polarization plane of the first polarized component; a second optical path, which is spatially separate from the first optical path, transmitting the second polarized component input from the polarizing beam splitter while maintaining the polarization plane of the second polarized component; and a polarizing beam mixer mixing the first polarized component and the second polarized component that were transmitted over the first optical path and the second optical path, respectively; the length A1 of the first optical path and the length A2 of the second optical path satisfying the equation $$|A2 \times n2 - A1 \times n1| \geq 0.22 \div \Delta v \times C$$

where n1 is the refractive index of the first optical path, n2 is the refractive index of the second optical path, $\Delta v$ is the line width of the signal light source, and C is light velocity.

8 Claims, 6 Drawing Sheets

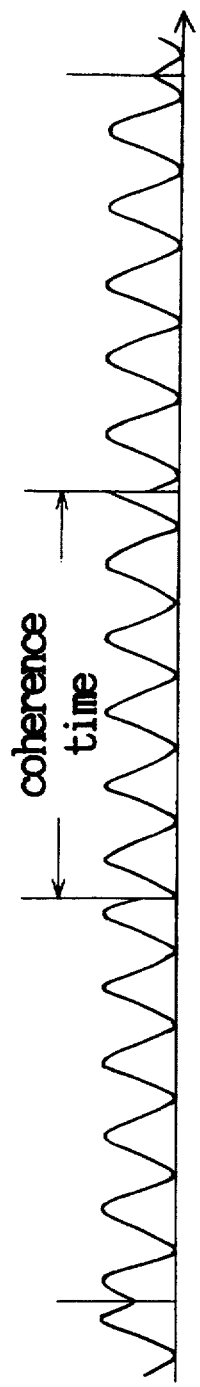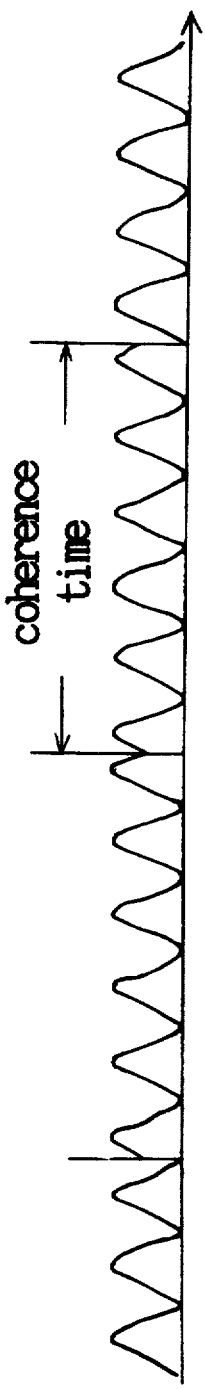
Fig. 6(a)
FIG. 6(b)

OPTICAL TRANSMITTER WITH THE SIGNAL LIGHT OF REDUCED DEGREE OF POLARIZATION AND OPTICAL DEPOLARIZING CIRCUIT

BACKGROUND OF THE INVENTION

The invention relates to an optical communication system and optical calibration system using the optical source depolarization technology.

Optical transmission circuits using such optical amplifiers as optical fiber amplifiers and optical repeaters are extremely flexible to varying transmission rates, and are about to be put into practical application as long-distance trunk circuits. In general, however, optical amplifiers have a polarization dependency of optical gain. An example of this is that an optical fiber amplifier has a polarization dependency originating from the optical components composing the amplifier.

As the optical amplification multi-repeater system, whose development is now under way, for most part only amplifies the light at each repeater to compensate for the attenuation of signal light during transmission, the signal light distortion and optical noise that occur during transmission and at every repeater accumulate to the point of rendering a substantial effect on the transmission characteristics of the entire system.

Consequently, each optical amplifier used for the multi-repeater amplification is required to have an amplification characteristic measurement of 0.1 dB or less, or in other words extremely high precision and high resolution. However, because the insertion loss of various optical components used in the optical amplifier varies according to the state of the polarization of the signal light, and also because one uses such a calibration apparatus as an optical spectrum analyzer that has a polarization dependency of approximately 0.5 dB, it is extremely difficult to satisfy the ultra high precision and ultra high resolution requirements.

The technology of measuring at ultra high precision and ultra high resolution the amplification characteristics of each optical amplifier used in multi-repeater amplification is extremely important in constructing an optical communication system. Consequently, considerable amount of research is being carried out on this subject.

Being studied as a means of improving the calibration resolution and calibration precision of optical amplifier characteristics is the method of effectively eliminating the polarization dependency of optical amplifiers and calibration systems by depolarizing or reducing the degree of the polarization of a signal light whose degree of polarization is normally around 1 to reduce the optical power that is susceptible to the influence of polarization dependency of the calibration system and the calibration subject.

Degree of polarization (equals the level of polarization) is expressed by the ratio of the polarized component power to the total power of the light. In essence, degree of polarization of 1 is completely polarized light and degree of polarization of 0 is completely depolarized light.

FIG. 5 is a graph that shows the correlation between the inherent size of polarization dependency of a calibration system and calibration subject and the optical power displacement of polarization dependency that is observed when a light with a low degree of polarization is used. In the figure, the horizontal axis indicates the inherent size of polarization dependency of calibration system and calibration subject and the vertical axis shows the actually measured polarization dependency. The lines $\alpha$, $\beta$, and $\gamma$ in the graph have a degree of polarization of 0.1, 0.25 and 0.5, respectively. Each line represents the calibrations when signal light is used.

As FIG. 5 clearly shows, even when the inherent polarization dependency of the calibration system and calibration subject is 0.5 dB, if the degree of polarization is 0.1 (the polarized component is 10% of the entire signal light), that is the observed polarization dependency is approximately 0.05 dB. When the degree of polarization is 0.5 (the polarized component is 50% of the entire signal light), that is the observed polarization dependency is approximately 0.26 dB.

As can be seen here, the smaller the degree of polarization of the light used for the calibration, the smaller the observed polarization dependency. It is clear that calibration precision can be greatly improved by using a light whose degree of polarization is 0.5 or less.

Described below is the principle of depolarization that reduces the degree of polarization of a light with a large degree of polarization. The phase of an optical output from a laser is constant during a period that is commonly called "coherence time" (approximately the inverse of the full-width half-maximum linewidth of optical source), and beyond the coherence time a vibration whose phase is randomly different from the previous phase occurs. Because of this, as shown in FIGS. 6(a), (b), if a laser light is branched and a time difference far in excess of the coherence time is given to one light, a constant phase relationship will no longer exist between the divided lights and there will no longer be a correlation between the two.

As polarization is defined by the sum of orthogonal polarized components with a constant phase relationship, one cannot specify any single phase relationship. In essence, if orthogonally polarized lights with no correlation are mixed with equal power, the resulting light is in a polarization state that cannot be universally prescribed: in other words, the light is depolarized with a degree of polarization of 0. Here, if the orthogonally polarized components are not mixed by equal power, the difference will be polarized and the degree of polarization will be larger than 0 as the differential power.

Even when the orthogonally polarized components are mixed by equal power, if there remains even the slightest correlation between the orthogonally polarized components the polarized optical power will increase proportionately, and thus the degree of polarization will be larger than 0 as the ratio of correlation. Consequently, to generate a light with a small degree of polarization, it is necessary to minimize the correlation between orthogonally polarized lights, and mix them with the same power whenever possible.

One of the conventional optical depolarizing circuits using the above depolarization principle was the depolarizing optical element that realizes said depolarizing conditions by using the transmission rate differential (i.e., polarization dispersion) between orthogonally polarized lights in a highly birefringent optical fiber to generate between the orthogonally polarized lights a delay difference that exceeds the coherence time (e.g., Patent Journal 59-155806, IEEE Journal of Light Wave Technology Vol. LT-1, No. 3, pp 475–479).

To use such a depolarizer to depolarize the narrow laser light used for long-distance ultra high speed optical communication systems, with a linewidth of approximately 100 MHz or less and with a long coherence time, it is necessary to have an extremely long fiber since the polarization dispersion of the current polarization maintaining fiber is small, about 2 ps/m.

Attaching a circuit for gain stabilization to each optical amplifier has been used as a means of stabilizing signal light power and signal reception. This method is problematic, however, in that it requires complex optical repeaters and additional cost. One of the ways to stabilize signal light power without incorporating circuits in optical amplifiers is the technology of employing a polarization scrambler in the optical transmitter.

However, a polarization scrambler is ineffective unless the polarization state is randomized at a speed above the bit rate of the signal light. Therefore, it is necessary to employ such hardware as optical devices and electric circuits that respond at extremely high speeds. Further, it is extremely difficult for such hardware to accommodate high bit rates.

Moreover, in an optical amplification repeater system whose transmission circuits are made of optical fibers with small polarization dispersion, the optical fiber non-linearity creates a four wave mixing between the signal light and the optical noise generated by the optical amplifier. The four wave mixing then induces signal deterioration, which is a major constraint of optical amplifier repeater system performance.

Four wave mixing is a type of non-linearity optical phenomenon caused by the non-linearity of optical fiber. It refers to a phenomenon whereby the interaction between two light waves of different wavelengths generates a new signal light at a distance from the light waves equal to the difference in wavelengths between the two light waves. The generation efficiency of four wave mixing is proportional to the power of the two light waves with different wavelengths. The generation efficiency also increases as the optical fiber dispersion approaches 0.

The generation efficiency of four wave mixing is proportionate to the power of the relevant light waves. It is optimized when all the relevant light waves are in the same state of polarization, and it is nearly zero when they are in orthogonal state of polarization. When four wave mixing is generated between depolarized light, such as the optical noise generated from an optical amplifier, and signal light, its generation efficiency cannot be reduced even with the use of a polarization scrambler. Thus, this signal deterioration is unavoidable.

Assume we have a depolarizer that uses an optical path of two orthogonal polarization components formed with one conventional polarization maintaining fiber, corresponding to the principal axis of the fiber, to provide a time difference between the two orthogonal polarization components. Given the refractive index of the polarization maintaining fiber is approximately 1.5, an extremely long fiber length, approximately 4 km, is necessary to achieve the delay difference of approximately 7.3 ns between the orthogonal polarization components in the polarization maintaining fiber that is in turn necessary to achieve the 0.1 or less degree of polarization for a linewidth of 100 MHz. This creates the problems below.

1) As mode coupling occurs between the two orthogonal polarization components within the polarization maintaining fiber, the travelling time difference between the orthogonal polarization components inside the polarization maintaining fiber does not increase in proportion to the optical fiber length, and thus the degree of polarization obtained cannot be reduced.

2) It is extremely difficult with the present fabrication technology to produce several kilometers of polarization maintaining fiber without a connection point. As mode coupling occurs between the orthogonal polarization components at connection points, the travelling time difference between the orthogonal polarization components inside the polarization maintaining fiber is reduced dramatically.

3) As the polarization maintaining fiber is lengthened, the propagation loss difference between the orthogonal polarization components becomes considerable, and because the optical power between the cross polarized lights becomes different, it becomes even more difficult to reduce the degree of polarization obtained.

4) Because the propagation loss of a polarization maintaining fiber of a few kilometers reaches a few dB, the signal light power of the polarization light obtained becomes small.

5) A polarization maintaining fiber of a few kilometers is a considerable amount. It would require large hardware and would prove to be extremely expensive.

If the linewidth of the light is 1/10, the necessary fiber length would be ten times. Consequently, it has been practically impossible to realize a light wave depolarization circuit with conventional technology.

SUMMARY OF THE INVENTION

The present first invention, in order to overcome the problems with conventional technology such as those described above, aims to provide a signal light transmitter that can realize a stable signal reception by eliminating light signal power fluctuations due to the polarization dependency of optical amplifiers without adding a complex circuit inside optical repeaters. At the same time, the invention aims to provide an optical transmitter with the signal light of reduced degree of polarization that can minimize signal deterioration from four wave mixing that occurs between signal light and optical noise generated from optical amplifiers.

The present second invention, in order to overcome the problems with conventional technology such as those described above, aims to provide a compact, low-loss, and inexpensive optical depolarizing circuit that can easily depolarize narrow linewidth light currently used in optical communication, a feat that is practically impossible with the conventional technology. The invention also aims to realize an efficient optical transmitter with the signal light of reduced degree of polarization.

The exclusive properties of the first invention, the optical transmitter with the signal light of reduced degree of polarization, are such that it comprises an optical source means that generates a signal light at the signal light transmitter used as a transmitting terminal in an optical repeater system including optical amplifiers and a degree of polarization reducing means, positioned at a stage proceeding the optical source means, that suppresses below a certain degree of polarization signal lights output from the optical source means.

The second invention, the optical depolarizing circuit, entails an optical path of two orthogonal polarization components that is formed spatially separate from each orthogonal polarization component. The delay difference between the orthogonal polarization components is obtained with different physical optical paths. This optical depolarizing circuit is used as the degree of polarization reducing means in the first invention, the optical transmitter with the signal light of reduced degree of polarization.

The optical depolarizing circuit, which has the first exclusive properties of the second invention, and which generates a signal light of reduced polarization, comprises a polarizing beam splitter that splits optical input into first polarized component and second polarized component that are perpendicular to each other; a first optical path that transmits the optical input from the polarizing beam splitter while maintaining the polarization plane of the first polarized component; a second optical path, which is spatially separate from the first optical path, that transmits the optical input from the polarizing beam splitter while maintaining the polarization plane of the second polarized component; a polarizing beam mixer that mixes the first polarized component and the second polarized component that were transmitted over the first optical path and the second optical path, respectively; and a means to provide attenuation to the optical input at the first optical path or the second optical path, or both.

An optical depolarizing circuit with the second exclusive properties of the second invention has exclusive properties of such that, at an optical depolarizing circuit with said first exclusive properties, A1, the length of the first optical path, and A2, the length of the second optical path, satisfy the equation below where n1 is the refractive index of the first optical path, n2 is the refractive index of second optical path, $\Delta v$ is the line width of optical input, and C is light velocity $$|A2 \times n2 - A1 \times n1| \geq 0.22 \div \Delta v \times C.$$

An optical depolarizing circuit with the third exclusive properties of the second invention has exclusive properties of such that, at an optical depolarizing circuit with said first or second exclusive properties, the first optical path and the second optical path comprise a polarization maintaining fiber or free space transmission.

An optical depolarizing circuit with the fourth exclusive properties of the second invention has exclusive properties of such that, at an optical depolarizing circuit that generates a signal light of reduced degree of polarization, comprises a first polarizing beam splitter that splits optical input into a first polarized component and a second polarized component that are orthogonal to each other; a first optical path that transmits the optical input from the polarizing beam splitter while maintaining the polarization plane of the first polarized component; a second optical path, which is spatially separate from the first optical path, that transmits the optical input from the polarizing beam splitter while maintaining the polarization plane of the second polarized component; a first polarizing beam mixer that mixes the first polarized component and the second polarized component that were transmitted over the first optical path and the second optical path, respectively; a second polarizing beam splitter that is positioned so the first polarized component and the second polarized component output by the polarizing beam mixer are input at 45 degrees with respect to the polarization axis and that splits the optical input into a third polarized component and fourth polarized component that are orthogonal to each other; a third optical path that transmits the third polarized component output from the polarizing beam splitter while maintaining the polarization plane of the third polarized component; a fourth optical path, which is spatially separate from the third optical path, that transmits the fourth polarized component output from the polarizing beam splitter while maintaining the polarization plane of the fourth polarized component; a second polarizing beam mixer that mixes the third polarized component and the fourth polarized component that were transmitted over the third optical path and the fourth optical path, respectively; first means to provide attenuation to either the first optical path or the second optical path, or both; and second means to provide attenuation to either the third optical path or the fourth optical path, or both.

An optical depolarizing circuit with the fifth exclusive properties of the second invention has exclusive properties of such that, at an optical depolarizing circuit with said fourth exclusive properties, A1, the length of the first optical path, A2, the length of the second optical path, A3, the length of third optical path, and A4, the length of the fourth optical path, satisfy the equation below where n1 is the refractive index of the first optical path, n2 is the refractive index of second optical path, n3 is the refractive index of the third optical path, n4 is the refractive index of the fourth optical path, $\Delta v$ is the line width of optical input, and C is light velocity $$|A2 \times n2 - A1 \times n1| \geq 0.22 \div \Delta v \times C$$

$$|A4 \times n4 - A3 \times n3| \geq 0.22 \div \Delta v \times C$$

$$||A2 \times n2 - A1 \times n1| - |A4 \times n4 - A3 \times n3|| \geq 0.22 \div \Delta v \times C.$$

An optical depolarizing circuit with the sixth exclusive properties of the second invention has exclusive properties of such that, at an optical depolarizing circuit with said fourth or fifth exclusive properties, the first optical path, second optical path, third optical path, and fourth optical path comprise a polarization maintaining fiber or free space transmission.

Optical transmitters for long-distance transmission that are in practical use today employ an optical source with a high degree of polarization (in general, 0.9 degree of polarization or higher) to enable a high speed digital signal light transmission. Consequently, it has been proven through experiments that gain fluctuations are caused by the polarization state of the signal light, and when the signals are transmitted through long-distance multiple amplification repeaters, that the signal light power fluctuates and signal light S/N ratio fluctuates to prevent a favorable signal reception as suggested by CCITT Recommendations (reference: IEE Electronics Letters, Vol 29, pp. 209–210, 1993).

As the first invention employs said configuration means to suppress the degree of polarization of optical source, it eliminates the fluctuation of signal light power due to polarization dependency of the optical amplifier of optical repeaters to enable a stable signal reception and minimizes signal deterioration due to four wave mixing.

The second invention forms a transmission circuit of two orthogonal polarization components by spatially separating it from each orthogonal polarization component (by combining a polarizing beam splitter, polarization maintaining fiber, etc.), as opposed to the conventional method of forming the transmission circuit with one polarization maintaining fiber. Because of this, the delay difference between the orthogonal polarized components is obtained with different physical optical paths.

For example, assume that for the second invention all the optical paths are formed with polarization maintaining fibers, and that the difference between first and second optical paths is 1 m. Since the delay time for 1 m of polarization maintaining fiber is approximately 5 ns, the time difference would be approximately 1,000 times that obtained by a conventional example employing a 1 m long polarization maintaining fiber with a delay time of approximately 2 ps per 1 m between the orthogonal polarization components in the polarization maintaining fiber. Consequently, the second invention can shorten the required optical path length to one-thousandth or less the conventionally required length.

Furthermore, as there is no interaction between the orthogonal polarization components, the delay difference between the orthogonal polarization components can be enlarged with ease. Therefore, the ratio of correlation between the orthogonal polarization components can be reduced and light with a small degree of polarization can be obtained easier than with conventional technology.

DESCRIPTION OF THE DRAWINGS

FIGS. 6a and 6b are graphs that illustrates the concept of depolarization.

DETAILED DESCRIPTION OF EXEMPLARY EMBODIMENTS

First Embodiment Example

A drawing is used to describe an embodiment example of the first invention.

Figure 1:
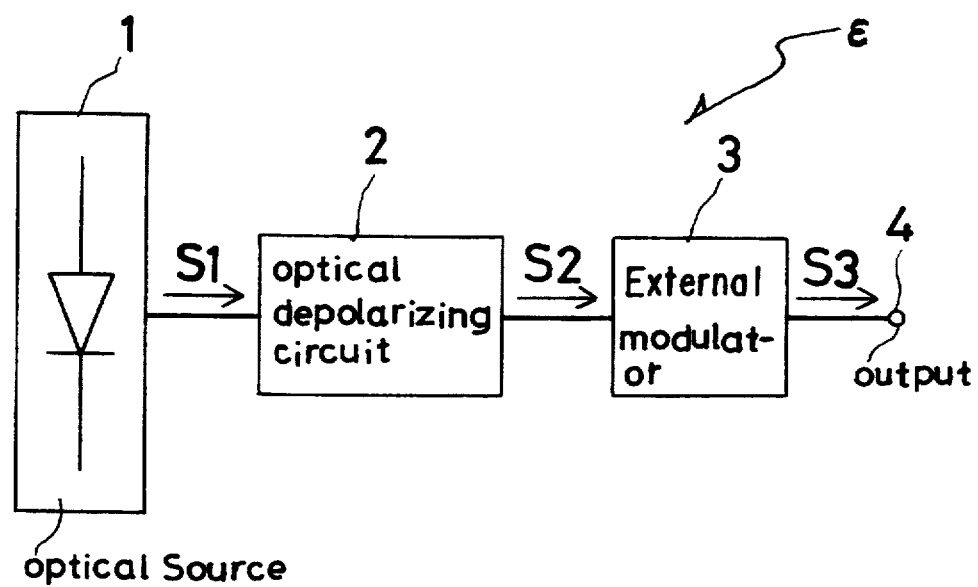
FIG. 1 is a block diagram of the embodiment example of the first invention.

FIG. 1 is a block diagram that illustrates the embodiment example. In the diagram, $\epsilon$ is the optical transmitter with the signal light of reduced degree of polarization, 1 is a transmitting laser diode optical source that outputs light with a high degree of polarization (hereinafter referred to as transmitting LD optical source), 2 is an optical depolarizing circuit, 3 is an external modulator, and 4 is a signal light output terminal. An electro-absorption semiconductor modulator, which can be used with light of a low degree of polarization, is one example of the external modulator.

In general, signal light S1 output from transmitting LD optical source 1 has a 0.9 degree of polarization. The degree of polarization of signal light S1 is reduced by optical depolarizing circuit 2 (e.g., to 0.3 degree of polarization or less). The signal light then passes through external modulator 3 and is output from signal light output terminal 4. The degree of polarization of signal light S3 exiting signal light output terminal 4 is equal to the degree of polarization of signal light S2 exiting optical depolarizing circuit 2.

The optical transmitter with the signal light of reduced degree of polarization in this embodiment example is made less susceptible to the influence of gain fluctuation caused by polarization dependency of the optical amplifier in the optical repeater and the influence of four wave mixing due to the optical fiber non-linearity by inserting means 2 (i.e., so-called optical depolarizing circuit) that reduces the degree of polarization of output signal light S1 of transmitting LD optical source 1 to 0.3 or less, for example, and thereby reducing the degree of polarization of signal light S1 and outputting this signal as signal light S2.

One of the ways in which the state of polarization can be expressed is with a Poincare sphere. The optical depolarizing circuit 2 used in this embodiment example is an element or a device that equally disperses throughout the Poincare sphere surface the input polarized light at a point or a small area on the Poincare sphere.

Some of the principles of optical depolarizing circuit 2 are that it uses a statistical phenomenon called scattering, that it uses an electro-optical crystal to change at a high speed the phase difference between the two orthogonal polarization components from 0 to $2\pi$ and that it splits the optical input into two intrinsic polarized lights and remixes the two.

One specific example of optical depolarizing circuit 2 comprises two polarization maintaining fibers, whose length exceeds that of the coherent length of the optical signal from the transmitting LD optical source 1, that are oriented at 45 degrees with respect to each other. This model has already been reported in a number of papers as a Lyot depolarizer.

It is also possible to split the light output by a single optical source into two lights with an optical splitter, make the two lights incoherent to each other, then remix the two lights into one. One of the methods of making the two lights incoherent to each other is to use a device that passes one of the lights through an optical fiber longer than the light's coherent length.

The embodiment example presents a specific form of application such as that described above. Described below are the operations of the optical transmitting terminal.

As signal light whose degree of polarization is minimized, unlike that whose degree of polarization is left high, is nearly unsusceptible to the effects of gain fluctuation due to the polarization dependency of the optical amplifier, the fluctuation in optical repeater output is suppressed and the fluctuation in signal light S/N ratio is prevented to enable a favorable reception.

For example, when the degree of polarization is 0.9 and a gain fluctuation of 0.5 dB occurs due to polarization dependency, the gain fluctuation can be suppressed to about 0.1 dB by reducing the degree of polarization to 0.3. Consequently the effect on signal light S/N ratio can be substantially reduced. Therefore, in general, the most favorable effect can be attained by using a polarization reducing means that suppresses the degree of polarization to 0.3 or less.

Furthermore, in an optical amplification repeater system whose transmission circuits are optical fibers with extremely small wavelength dispersion, the optical fiber non-linearity creates a four wave mixing between the signal light and the optical noise generated by the optical amplifier. The four wave mixing then induces signal deterioration, which is a major constraint of optical amplifier repeater system performance.

The generation efficiency $\eta$ of four wave mixing is proportionate to the power Pn of the relevant light waves. It is optimized when all the relevant light waves are in the same polarization state, and it is nearly zero when they are in orthogonal polarization state. For example, when two types of light waves (L1, L2) are related to four wave mixing, the interference light power Pfp that is generated by the four wave mixing can be expressed as equation (1).

$$Pfp = \eta(P1, P2, \Phi 12) P1 P2 \qquad (1)$$

In Equation (1) above, P1 is the power of light wave L1, P2 is the power of light wave L2, and $\eta(P1, P2, \Phi 12)$ indicates that the generation efficiency $\eta$ of four wave mixing is proportionate to the power P1 and P2 of light waves L1 and L2 and that it is a function of phase correlation $\Phi 12$ of light waves L1 and L2.

As can be seen from Equation (1) above, Pfp is a secondary function of the power P of light wave. When the degree of polarization is 0.9, Psn is the interference light power that occurs between the signal light Ls (power Ps) and optical noise Ln (power Pn) and $\eta sn$ is the generation efficiency of four wave mixing, the interference light power Psn is expressed as Equation (2) below.

$$Psn = \eta sn Ps Pn \qquad (2)$$

When the degree of polarization of signal light is 0.3, the power of the entire signal light is dispersed between the orthogonally polarized waves. Consequently, $\eta sn'$, the generation efficiency of four wave mixing, can be suppressed to a low value. Where $\eta sn'$ is expressed as $\eta sn$, we have Equation (3) below.

$$\eta sn' = 0.68 \eta sn \qquad (3)$$

Therefore, Psn', the interference light power that occurs when the degree of polarization is 0.3, can be expressed by Equation (4) below, considering the components of the orthogonally polarized waves.

$$Psn' = (0.46 + 0.23) \eta sn Ps Pn = 0.69 \eta sn Ps Pn \qquad (4)$$

As indicated by Equation (4), because Psn', the interference power generated by four wave mixing, is suppressed to 1.6 dB, the signal deterioration due to four wave mixing is reduced. In particular, if the degree of polarization is brought down to 0, the power is equally allocated between the orthogonally polarized waves. In this case, the interference power generated by four wave mixing is suppressed to 3 dB, and the optical fiber non-linearity effect on the entire optical repeater system can be reduced.

Second Embodiment Example

Figure 2:
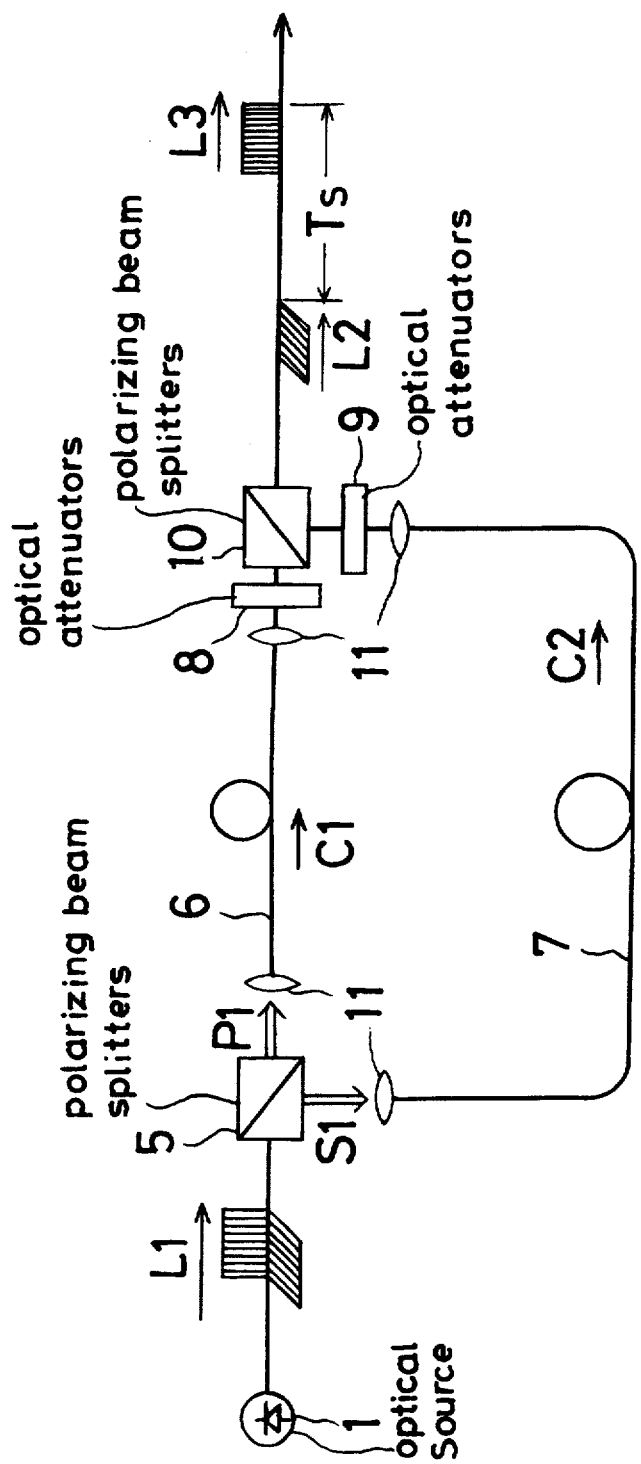
FIG. 2 is a block diagram of the configuration of the first embodiment example of the second invention.

Drawings are used to describe the first embodiment example of the second invention. FIG. 2 shows the configuration of a depolarizing circuit of this embodiment example that attains a 0.1 degree of polarization.

In the figure, 1 is an optical source, such as a DFB semiconductor, that oscillates L1, a narrow band laser light whose linewidth of the light $\Delta\nu$ is 100 MHz (full width at half maximum) and whose spectrum distribution is a Lorenz distribution, and 5 is a polarizing beam splitter that splits optical input L1 into orthogonal polarization components and outputs lights P1 and S1.

6 is a polarization maintaining fiber whose refractive index is 1.5 and length is 5 cm that forms optical path C1 for transmitting optical output P1 from the polarizing beam splitter 5 while maintaining its polarization plane. 7 is a polarization maintaining fiber whose refractive index is 1.5 and length is 1.55 m that forms optical path C2 for transmitting optical output S1 from the polarizing beam splitter 5 while maintaining its polarization plane. 8 and 9 are optical attenuators for adjusting both orthogonal polarization components P1 and S1 so that they are of the same power. 10 is a polarizing beam splitter that mixes optical inputs P1 and S1, which are orthogonal to each other. 11 is a conversion lens that focuses the light.

Since 8 and 9, optical attenuators, are used to equalize the power of the orthogonal polarization components P1 and S1 after mixing, either one may be omitted.

Polarization maintaining fibers 6 and 7 optically connect the polarizing beam splitter 5 and polarizing beam splitter 10. To prevent the polarization state of the polarization maintaining fibers from changing from changes in such environmental conditions as temperature and vibration inside optical paths C1 and C2, the polarization maintaining fibers are placed so that each polarization axis matches with the polarization axis of polarizing beam splitter 5 and that of polarizing beam splitter 10.

The polarization axis of polarizing beam splitters 5 and 10 are assumed to be, for sake of simplicity in the descriptions below, two axes, one which is vertical to this document (hereinafter referred to as the vertical axis) and one which is orthogonal to the vertical axis on a plane that is parallel to this document (hereinafter referred to as the horizontal axis).

Delay times T1 and T2 are the time required for the two optical outputs P1 and S1 from the polarizing beam splitter 5 to pass optical paths C1 and C2. The difference between T1 and T2 (delay difference Ts = T2 − T1) is determined according to the desired degree of polarization.

Figure 3:
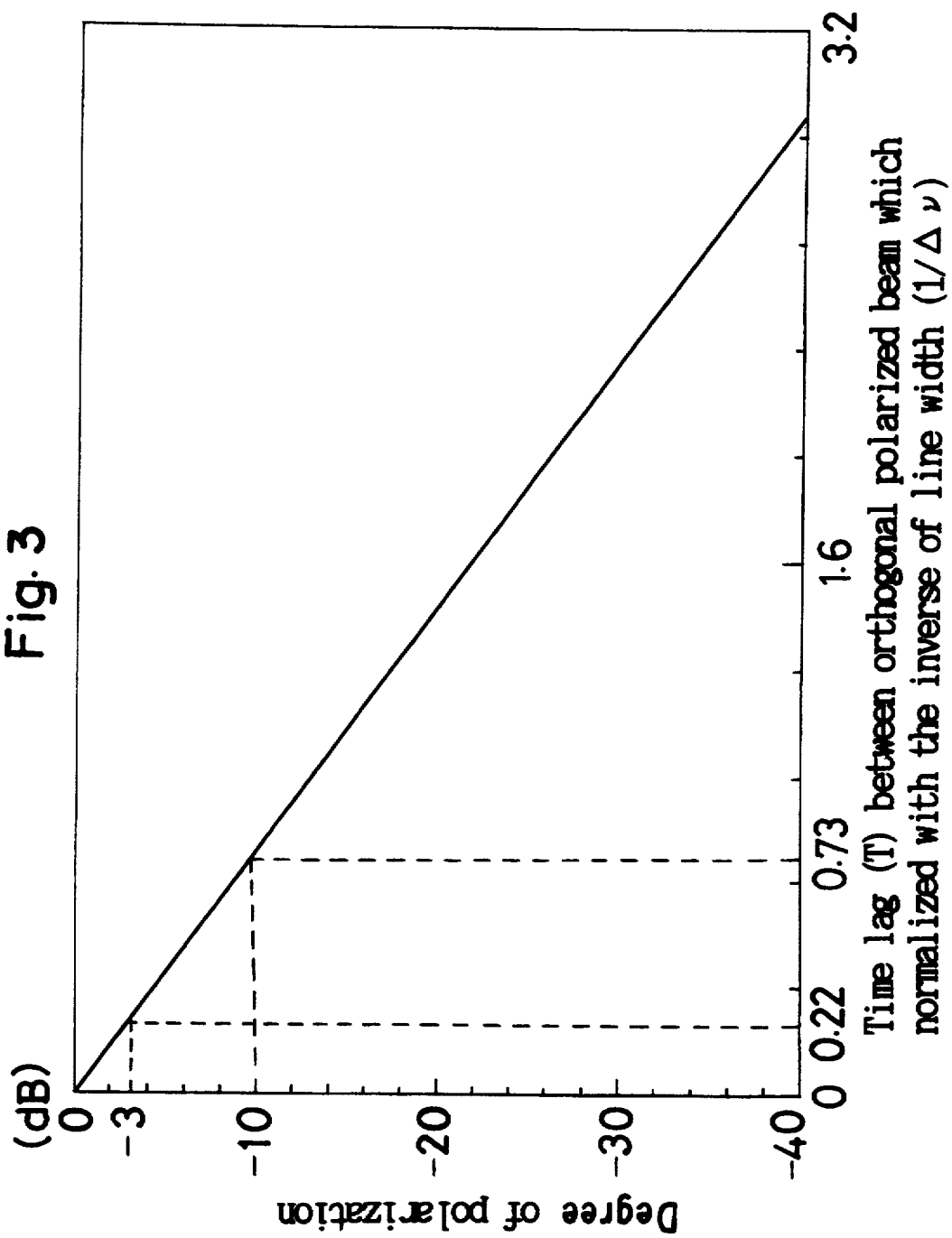
FIG. 3 is a graph that explains the principle of operation of the above. It indicates the correlation between the time lag and the ratio of polarization.

FIG. 3 shows the correlation between the time lag T and the degree of polarization. Time lag T is normalized with the inverse of linewidth $\Delta\nu$ of optical source 1, such as a DFB semiconductor laser, whose spectrum distribution is a Lorenz distribution. The degree of polarization is that obtained when the light exiting said optical source is split into two orthogonal polarization components, only one is delayed by time lag T, and the two orthogonal polarization components are remixed. From this correlation, it can be seen that to attain a 0.5 (−3 dB) degree of polarization, a delay difference Ts of $0.22/\Delta\nu$ or more is necessary and to attain a 0.1 (−10 dB) degree of polarization, a delay difference Ts of $0.73/\Delta\nu$ or more is necessary.

Therefore, the lengths of optical paths C1 and C2 can be derived from the following equation:

$$|A2 \times n2 - A1 \times n1| \geq Ts \times C$$

where A1 is the length of optical path C1, A2 is the length of optical path C2, n1 is the refractive index of optical path C1, n2 is the refractive index of optical path C2, $\Delta\nu$ is the linewidth of optical input, and C is light velocity.

A degree of polarization of 0.5 or less is believed to be necessary for an optical depolarizing circuit to work effectively. To attain this ratio of polarization, we need $Ts = 0.22/\Delta\nu$. Therefore, the equation below can be considered as a practical configuration:

$$|A2 \times n2 - A1 \times n1| \geq 0.22 \div \Delta\nu \times C.$$

Therefore, when the linewidth of the light $\Delta\nu$ is 100 MHz, as in the embodiment example, the delay difference Ts necessary to attain the 0.1 degree of polarization would be approximately 7.3 ns. If the polarization maintaining fiber 6 is extremely short and delay time T1 is so small that it can be considered as 0 s, assuming that the refractive index of polarization maintaining fibers 6 and 7 is approximately 1.5, the required length of the polarization maintaining fiber 7 is at least approximately 1.5 m longer than the length of polarization maintaining fiber 6.

Therefore, since the refractive index of polarization maintaining fibers 6 and 7 is approximately 1.5 in this embodiment example, if the length of polarization maintaining fiber 6 is 5 cm, polarization maintaining fiber 7 needs to be approximately 1.55 m in length. If polarization maintaining fiber 6 is 10 cm in length, polarization maintaining fiber 7 needs to be approximately 1.6 m in length.

Described below are the operating principles of the embodiment example.

Optical attenuators 8 and 9 are used in optical paths C1 and C2, respectively, to adjust the loss between the input terminal of polarizing beam splitter 5 and the output terminal of polarizing beam splitter 10 so that it coincides with polarized components that are parallel to the vertical axis (hereinafter referred to as vertical polarized light) and polarized components that are parallel to the horizontal axis (hereinafter referred to as the horizontal polarized light).

When linearly polarized light (optical input L1), which is turned 45 degrees from the vertical axis on a plane where the polarization axis is vertical to the text, is input from optical source 1 to polarizing beam splitter 5, the linearly polarized light evenly enters the vertical axis and horizontal axis of polarizing beam splitter 5.

Therefore, the effects of the second invention can most easily be obtained if the first optical depolarizing circuit is fixed so that optical input can enter the polarizing beam splitter 5 in a polarization state that is near a linearly polarized light that is turned 45 degrees from the vertical axis on a plane where the polarization axis is vertical.

Since the loss between the input terminal of polarizing beam splitter 5 and the output terminal of polarizing beam splitter 10 is adjusted so that it coincides with the vertical polarized light and horizontal polarized light, the optical outputs L2 and L3 (cross polarized components) mixed by polarizing beam splitter 10 are of equal power and are provided a delay difference Ts that is approximately 0.73 times the inverse of the linewidth of the light at optical path C2.

Therefore, the degree of polarization of the optical output is 0.1 or less.

Described below is the scenario in which optical input L1 of arbitrary polarization state is input.

Arbitrary polarization state is expressed by the sum of the orthogonal states of polarization. Therefore, if optical input L1 of arbitrary polarization state enters polarizing beam splitter 5, the power entering the vertical axis and horizontal axis of polarizing beam splitter 5 will not be equal. However, by using optical attenuators 8 and 9, it is possible to equalize the power of optical outputs L2 and L3 that are mixed by polarizing beam splitter 10.

Therefore, if some power loss in optical outputs L2 and L3 can be permitted, the degree of polarization of optical outputs L2 and L3 can be reduced to 0.1 or less. In this embodiment example, to prevent the output power loss as much as possible, it is necessary to fix the input polarization state so that the optical input can enter the polarizing beam splitter 5 in a polarization state that is near a linearly polarized light that is turned 45 degrees from the vertical axis on a plane where the polarization axis is vertical to the text.

Furthermore, the polarization maintaining fibers 6 and 7 used for the optical path C1 or C2 mentioned above can be formed with mirrors, for example, given that the optical path C1 or C2 is sufficiently short and the polarization state in the optical path can withstand changes in such environmental conditions as temperature and vibration.

Moreover, optical attenuators 8 and 9 may be omitted if the power of optical outputs L2 and L3 mixed by polarizing beam splitter 10 can be made equal when the input polarization state is fixed. In addition, conversion lens 11 not necessary if the light does not spread.

Third Embodiment Example

A drawing is used to describe the second embodiment example of the second invention.

Figure 4:
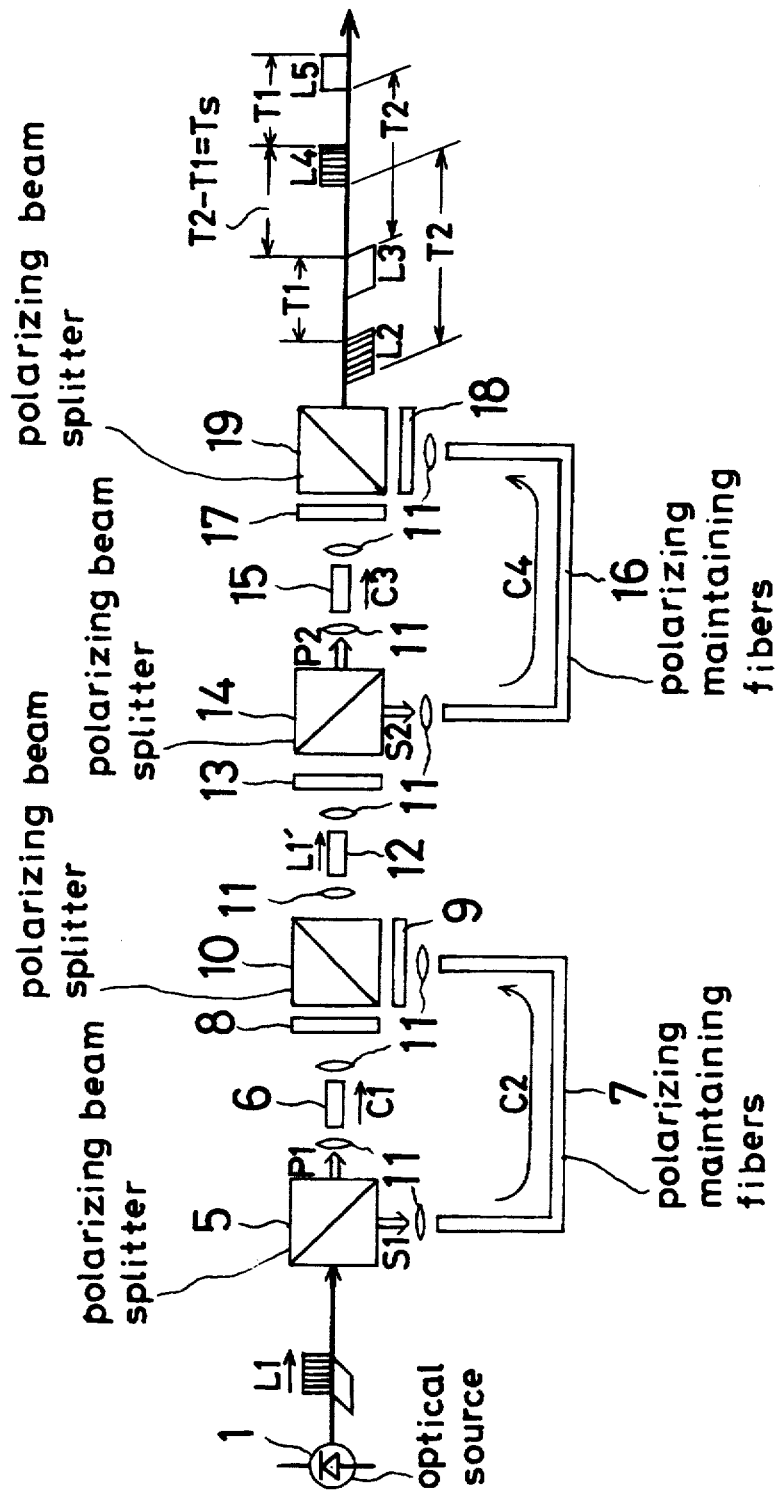
FIG. 4 is a block diagram of the configuration of the second embodiment example of the second invention.
Figure 5:
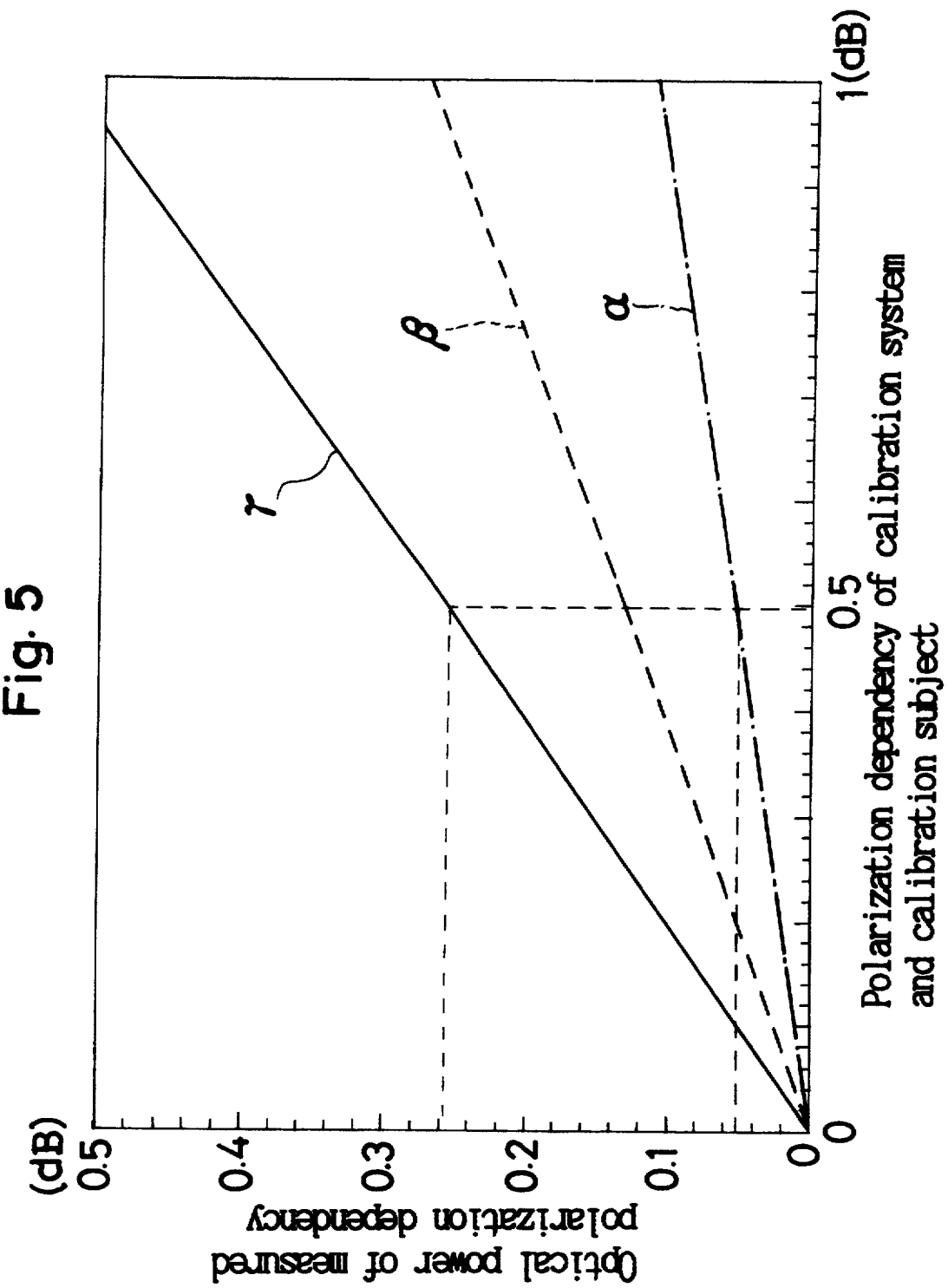
FIG. 5 is a graph that indicates the correlation between the size of the inherent polarization dependency of calibration system and calibration subject and the optical power displacement of polarization dependency measured when a light with a low degree of polarization is used.

FIG. 4 is a block diagram that sets forth the configuration of the optical depolarizing circuit of the embodiment example.

This embodiment example is different from the first embodiment example in that the first embodiment example is modified into a two-stage configuration using half-wave plate 13 to prevent loss of output power even if the optical input is in arbitrary polarization state.

As this embodiment example employs an optical depolarizing circuit whose linewidth of the light $\Delta\nu$ is 100 MHz and that obtains a 0.1 degree of polarization, the necessary delay difference Ts is approximately 7.3 ns, the refractive index of polarization maintaining fibers 6, 7, 15, and 16 is approximately 1.5, the length of each of polarization maintaining fibers 6 and 15 is 5 cm, the length of polarization maintaining fiber 7 is approximately 1.55 m, and the length of polarization maintaining fiber 16 is 3.05 m. These lengths can be arbitrary selected using the equation presented later. For example, if the length of polarization maintaining fibers 6 and 15 is 10 cm, the length of polarization maintaining fiber 7 would be approximately 1.6 m and the length of polarization maintaining fiber 16 would be approximately 3.1 m.

This embodiment example is formed as described above. Described below are, among others, the differences of this embodiment example from the first embodiment example.

The configuration from optical source 1 to polarizing beam splitter 10 is the same as that of the first embodiment example, so its description is omitted. The configuration from polarizing beam splitter 14 to polarizing beam splitter 19 (this segment of the configuration is hereinafter referred to as the second stage) is also the same as that of polarizing beam splitter 5 to polarizing beam splitter 10 of the first embodiment example (this segment of the configuration is hereinafter referred to as the first stage).

In this embodiment example, polarization maintaining fiber 12 is placed between the first stage and second stage of the configuration and half-wave plate 13 is installed so that the polarization axis of the light used is turned 45 degrees on the vertical plane. In addition, the polarization maintaining fiber 12 between polarizing beam splitter 10, which is the output of the first stage, and half-wave plate 13 is situated so that its polarization axis coincides with the polarization axis of polarizing beam splitter 10. Therefore, the optical axis of the polarized component that is parallel to both the vertical axis and horizontal axis and that is output from polarizing beam splitter 10 of the first stage and input to half-wave plate 13 can easily be matched at the input terminal of polarizing beam splitter 14 in the second stage.

Optical attenuators 8 and 9 are used to adjust the loss between the input terminal of polarizing beam splitter 5 and the output terminal of half-wave plate 13 so that it coincides with polarized components that are parallel to the vertical axis and polarized components that are parallel to the horizontal axis.

Where T1 to T4 are propagation time (delay time) for optical paths C1 to C4, and Ts is the delay difference necessary for the desired degree of polarization that is obtained from FIG. 3 as shown in the first embodiment example, the length of optical paths C1 to C4 should be formed as $$|T2-T1| > Ts$$

$$|T4-T3| > Ts$$

$$||T4-T3|-|T2-T1|| > Ts.$$

Therefore, A1, the length of optical path C1, A2, the length of optical path C2, A3, the length of optical path C3, and A4, the length of optical path C4 can be derived by $$|A2 \times n2 - A1 \times n1| \geq Ts \times C$$

$$|A4 \times n4 - A3 \times n3| \geq Ts \times C$$

$$||A2 \times n2 - A1 \times n1| - |A4 \times n4 - A3 \times n3|| \geq Ts \times C$$

where n1 is the refractive index of optical path C1, n2 is the refractive index of optical path C2, n3 is the refractive index of optical path C3, n4 is the refractive index of optical path C4, $\Delta \nu$ is the line width of optical input, and C is light velocity.

A degree of polarization of 0.5 or less is believed to be necessary for an optical depolarizing circuit to work effectively. To attain this degree of polarization, we need $Ts = 0.22/\Delta \nu$. Therefore, the equation below can be considered as a practical configuration:

$$|A2 \times n2 - A1 \times n1| \geq 0.22 \div \Delta \nu \times C$$

$$|A4 \times n4 - A3 \times n3| \geq 0.22 \div \Delta \nu \times C$$

$$||A2 \times n2 - A1 \times n1| - |A4 \times n4 - A3 \times n3|| \geq 0.22 \div \Delta \nu \times C.$$

Moreover, optical attenuators 17 and 18 may be omitted if the loss between polarizing beam splitter 14 and polarizing beam splitter 19 can be matched to the polarized components that are parallel to the vertical axis and polarized components that are parallel to the horizontal axis.

Furthermore, as with the first embodiment example, the polarization maintaining fibers 15 and 16 used for the optical path C3 or C4 can be formed with mirrors, for example, given that the optical path C3 or C4 is sufficiently short and the polarization state in the optical path can withstand changes in such environmental conditions as temperature and vibration. Moreover, optical attenuators 17 and 18 may be omitted if the power of optical outputs L2 and L3 mixed by polarizing beam splitter 19 can be made equal when the input polarization state is fixed.

Described below are the operating principles of the embodiment example.

When linearly polarized light (optical input L1), which has a polarization plane that is parallel to the vertical axis, is input from optical source 1 to polarizing beam splitter 5, the light exits polarizing beam splitter 10 as a linearly polarized light (optical output L1') with a polarization plane that is parallel to the vertical axis. The polarization axis is turned 45 degrees by half-wave plate 13, then the light enters evenly to the vertical axis and horizontal axis of polarizing beam splitter 14, then exits to polarization maintaining fibers 15 and 16 (optical outputs P2 and S2).

Since the optical outputs P2 and S2 mixed by polarizing beam splitter 19 and output by polarizing beam splitter 11 are of equal power and are given a delay difference T2 of approximately 1.5 times the inverse of linewidth of light at optical path C4, the optical output has a degree of polarization of 0.1 or less.

Also when a linearly polarized light with a polarization plane that is parallel to the horizontal axis is input from optical source 1 to polarizing beam splitter 5, the same principle of operation as that described above applies, and an optical output of a degree of polarization of 0.1 or less can be obtained from polarizing beam splitter 19.

Arbitrary polarization state is expressed by the sum of the orthogonal states of polarization. Therefore, if a light of arbitrary polarization state enters polarizing beam splitter 5, it can be considered as being of linear polarized components that are parallel to the vertical axis and horizontal axis. Each of these orthogonal polarization components become, due to the principle of operation above, depolarized light at the output of polarizing beam splitter 19.

Here, as the delay difference T2 is double the delay difference Ts, there is a delay difference Ts that is at least 0.73 times the inverse of the linewidth of the light between the orthogonal polarization components of the optical output obtained at the output of polarizing beam splitter 19. Therefore, the degree of polarization of optical outputs L2, L3, L4, and L5 is at least about 0.1. Consequently, it can be seen that the second invention can obtain an optical output of 0.1 or less regardless of the polarization state of optical input L1.

The half-wave plate 13 used in this embodiment example can be omitted if the polarization axis of polarizing beam splitter 10 and that of polarizing beam splitter 14 can be placed at 45 degrees with respect to each other by, for example, turning the output terminal of polarization maintaining fiber 12 by 45 degrees. In addition, the polarization maintaining fiber 12 between polarizing beam splitter 10 and half-wave plate 13 can be omitted if the optical axis of polarized components that are parallel to the vertical axis and horizontal axis and that are output from polarizing beam splitter 10 and input to half-wave plate 13 can be coincided after the output terminal.

Moreover, the polarization maintaining fibers 6, 7, 15, and 16 used for the optical paths C1, C2, C3, and C4 can be omitted if the optical paths C1, C2, C3, and C4 are sufficiently short and the polarization state in the optical paths can withstand changes in such environmental conditions as temperature and vibration.

Optical attenuators 8, 9, 17, and 18 may be omitted if they are not necessary for coinciding the loss between the input terminals of polarizing beam splitters 5 and 14 and the input terminals of polarizing beam splitters 10 and 19 with polarized components that are parallel to the vertical axis and those that are parallel to the horizontal axis. The optical attenuators may also be omitted if the optical output can be permitted to change from the changes in the polarization state of the optical input.

Although this embodiment example shows a second stage configuration, it may be replaced with n stages. In this case, it is necessary for the configuration to allow the polarization axis of the light between the configuration of n−1 stage and that of n stage to be turned 45 degrees on the plane that is vertical to the text.

With the first invention, as described above, the output power of an optical repeater can be stabilized in an optical communication system that employs an optical amplifier with a polarization dependency as an optical repeater without the need for a complex optical repeater configuration. The invention has an extremely beneficial effect on stabilizing the signal light S/N ratio.

In addition, since the reception signal deterioration due to optical fiber non-linearity is unavoidable as long as an optical fiber is used as a transmission circuit, the effect of the invention in reducing signal light deterioration, among others, is extremely useful.

With the second invention, polarizing beam splitters that split optical input into orthogonal polarization components and polarization maintaining fibers (or mirrors) are used instead of high-birefringent optical fibers to independently delay the orthogonal polarization components without interaction, and a polarizing beam splitter is used to equalize the power of the components. Consequently, the delay difference between the orthogonal polarization components can be obtained with the physical optical path difference between the orthogonal polarization components. Therefore, the optical path length (polarization maintaining fiber length) can be reduced to less than one-thousandth the conventional length. As a result, with the invention, it is possible to realize an optical depolarizing circuit that is far more compact, low-loss, and inexpensive than the conventional counterpart.

In addition, as there is no interaction between the orthogonal polarization components, the delay difference between the orthogonal polarization components can easily be increased to reduce the ratio of correlation between the orthogonal polarization components. Consequently, light with a small degree of polarization can be obtained easier than with conventional methods. Therefore, the second invention substantially improves the precision and resolution of optical amplifier characteristic calibration, and by using the invention as a signal optical source to build an optical amplifier multi-repeater system, the transmission characteristics would be greatly improved. Because of these benefits, the effect of the invention is tremendous.

In addition, by designing the polarizing beam splitter in a two-stage configuration, and by positioning the polarizing beam splitter so the first polarized component and second polarized component are input at 45 degrees with respect to the polarization axis, it is possible to prevent the loss of output power even if the optical input is of arbitrary polarization state. Consequently, this invention is extremely useful.

What we claim is:

1. An optical transmitter for providing a signal light with a reduced degree of polarization, said optical transmitter being used as a transmitting terminal of an optical repeater system that encompasses optical amplifiers at a signal light transmitter, said optical transmitter comprising:

an optical source means for transmitting a signal light source; and a degree of polarization reducing means comprising:
a polarizing beam splitter for splitting the signal light source from said optical source means into a first polarized component and a second polarized component that are orthogonal to each other;
a first optical path for transmitting the first polarized component input from said polarizing beam splitter while maintaining the polarization plane of the first polarized component, said first optical path having a length A1;
a second optical path, which is spatially separate from said first optical path, for transmitting the second polarized component input from said polarizing beam splitter while maintaining the polarization plane of the second polarized component, said second optical path having a length A2; and
a polarizing beam mixer for mixing the first polarized component and the second polarized component that were transmitted over said first optical path and said second optical path, respectively;
wherein the length A1 of said first optical path and the length A2 of said second optical path satisfy the equation $$|A2 \times n2 - A1 \times n1| \geq 0.22 \div \Delta v \times C$$

where n1 is the refractive index of said first optical path, n2 is the refractive index of said second optical path, $\Delta v$ is the line width of the signal light source, and C is light velocity.

2. An optical transmitter for providing a signal light of a reduced degree of polarization according to the claim 1, wherein said first optical path and said second optical path comprise one of:
a polarization maintaining fiber and
a free space transmission.

3. An optical transmitter for providing a signal light of a reduced degree of polarization, said optical transmitter being used as a transmitting terminal of an optical repeater system that encompasses optical amplifiers at a signal light transmitter, said optical transmitter comprising:

an optical source means for transmitting a signal light source; and a degree of polarization reducing means for suppressing the signal light source output from said optical source means below a predetermined degree of polarization and for providing a signal light of reduced degree of polarization, wherein said degree of polarization reducing means comprises:

a first polarizing beam splitter for splitting the signal light source from said optical source means into a first polarized component and a second polarized component that are orthogonal to each other;

a first optical path for transmitting the first polarized component input from said first polarizing beam splitter while maintaining the polarization plane of the first polarized component, said first optical path having a length A1;

a second optical path, which is spatially separate from said first optical path, for transmitting the second polarized component input from said first polarizing beam splitter while maintaining the polarization plane of the second polarized component, said second optical path having a length A2;

a first polarizing beam mixer for mixing the first polarized component and the second polarized component that were transmitted over said first optical path and said second optical path, respectively;

a second polarizing beam splitter, which is positioned so the first polarized component and the second polarized component output by said polarizing beam mixer are input at 45 degrees with respect to the polarization axis, for splitting the signal light source from said first polarizing beam mixer into a third polarized component and a fourth polarized component that are orthogonal to each other;

a third optical path for transmitting the third polarized component input from said second polarizing beam splitter while maintaining the polarization plane of the third polarized component, said third optical path having a length A3;

a fourth optical path, which is spatially separate from said third optical path, for transmitting the fourth polarized component input from said second polarizing beam splitter while maintaining the polarization plane of the fourth polarized component, said fourth optical path having a length A4;

a second polarizing beam mixer for mixing the third polarized component and the fourth polarized component that were transmitted over said third optical path and said fourth optical path, respectively;

wherein the length A1 of said first optical path, the length A2 of said second optical path., the length A3 of said third optical path, and the length A4 of said fourth optical path satisfy the equations $$|A2 \times n2 - A1 \times n1| \geqq 0.22 \div \Delta v \times C$$

$$|A4 \times n4 - A3 \times n3| \geqq 0.22 \div \Delta v \times C$$

$$||A2 \times n2 - A1 \times n1| - |A4 \times n4 - A3 \times n3|| \geqq 0.22 \div \Delta v \times C$$

where n1 is the refractive index of said first optical path, n2 is the refractive index of said second optical path, n3 is the refractive index of said third optical path, n4 is the refractive index of said fourth optical path, $\Delta v$ is the line width of the signal light source, and C is light velocity.

4. An optical transmitter for providing a signal light of reduced degree of polarization according to claim 3, wherein said first optical path, said second optical path, said third optical path and said fourth optical path comprise one of:
  a polarization maintaining fiber and
  a free space transmission.

5. An optical depolarizing circuit for providing a signal light of reduced degree of polarization comprising:

a polarizing beam splitter for splitting an optical input into a first polarized component and a second polarized component that are orthogonal to each other;

a first optical path for transmitting the first polarized component from said polarizing beam splitter while maintaining the polarization plane of the first polarized component, said first optical path having a length A1;

a second optical path, which is spatially separate from said first optical path, for transmitting the second polarized component input from said polarizing beam splitter while maintaining the polarization plane of the second polarized component, said second optical path having a length A2;

a polarizing beam mixer for mixing the first polarized component and the second polarized component that were transmitted over said first optical path and said second optical path, respectively; and wherein the length A1 of said first optical path and the length A2 of said second optical path satisfy the equation $$|A2 \times n2 - A1 \times n1| \geqq 0.22 \div \Delta v \times C$$

where n1 is the refractive index of said first optical path, n2 is the refractive index of said second optical path, $\Delta v$ is the line width of the signal light source, and C is light velocity.

6. An optical depolarizing circuit according to claim 5,
wherein said first optical path and said second optical path comprise one of:
  a polarization maintaining fiber and
  a free space transmission.

7. An optical depolarizing circuit for providing a signal light of reduced degree of polarization comprising:

a first polarizing beam splitter for splitting an optical input into a first polarized component and a second polarized component that are orthogonal to each other;

a first optical path for transmitting the first polarized component from said first polarizing beam splitter while maintaining the polarization plane of the first polarized component, said first optical path having a length A1;

a second optical path, which is spatially separate from said first optical path, for transmitting the second polarized component input from said first polarizing beam splitter while maintaining the polarization plane of the second polarized component, said second optical path having a length A2;

a first polarizing beam mixer for mixing the first polarized component and the second polarized component that were transmitted over said first optical path and said second optical path, respectively;

a second polarizing beam splitter, which is positioned so the first polarized component and the second polarized component output by said first polarizing beam mixer are input at 45 degrees with respect to the polarization axis, for splitting the optical input from said first polarizing beam mixer into a third polarized component and a fourth polarized component that are orthogonal to each other;

a third optical path for transmitting the third polarized component input from said second polarizing beam splitter while maintaining the polarization plane of the third polarized component, said third optical path having a length A3;

a fourth optical path, which is spatially separate from said third optical path, for transmitting the fourth polarized component input from said second polarizing beam splitter while maintaining the polarization plane of the fourth polarized component, said fourth optical path having a length A4;

a second polarizing beam mixer for mixing the third polarized component and the fourth polarized component that were transmitted over said third optical path and said fourth optical path, respectively;

wherein the length A1 of said first optical path, the length A2 of said second optical path the length A3 of said third optical path, and the length A4 of said fourth optical path satisfy the equations $$|A2 \times n2 - A1 \times n1| \geq 0.22 \div \Delta v \times C$$

$$|A4 \times n4 - A3 \times n3| \geq 0.22 \div \Delta v \times C$$

$$||A2 \times n2 - A1 \times n1| - |A4 \times n4 - A3 \times n3|| \geq 0.22 \div \Delta v \times C$$

where n1 is the refractive index of said first optical path, n2 is the refractive index of second optical path, n3 is the refractive index of said third optical path, n4 is the refractive index of said fourth optical path, $\Delta v$ is the line width of the signal light source, and C is light velocity.

8. An optical depolarizing circuit according to claim 7, wherein said first optical path, said second optical path, said third optical path and said fourth optical path comprise one of:

a polarization maintaining fiber and a free space transmission.

* * * * *